(12) United States Patent
Kondo

(10) Patent No.: US 10,845,218 B2
(45) Date of Patent: Nov. 24, 2020

(54) ENCODER, ROBOT, AND PRINTER

(71) Applicant: Seiko Epson Corporation, Tokyo (JP)

(72) Inventor: Takayuki Kondo, Chino (JP)

(73) Assignee: Seiko Epson Corporation

(*) Notice: Subject to any disclaimer, the term of this patent is extended or adjusted under 35 U.S.C. 154(b) by 395 days.

(21) Appl. No.: 15/873,386

(22) Filed: Jan. 17, 2018

(65) Prior Publication Data

US 2018/0209822 A1    Jul. 26, 2018

(30) Foreign Application Priority Data

Jan. 23, 2017 (JP) ................................. 2017-009720

(51) Int. Cl.
| | |
|---|---|
| *G01D 5/347* | (2006.01) |
| *G06T 7/73* | (2017.01) |
| *B25J 13/08* | (2006.01) |
| *B25J 9/00* | (2006.01) |
| *B25J 9/04* | (2006.01) |
| *B25J 19/02* | (2006.01) |
| *G01D 5/244* | (2006.01) |
| *G05B 19/12* | (2006.01) |

(52) U.S. Cl.
CPC ........ *G01D 5/34707* (2013.01); *B25J 9/0009* (2013.01); *B25J 9/044* (2013.01); *B25J 13/088* (2013.01); *B25J 13/089* (2013.01); *B25J 19/022* (2013.01); *G01D 5/24452* (2013.01); *G01D 5/3473* (2013.01); *G01D 5/34792* (2013.01); *G06T 7/74* (2017.01); *G05B 19/124* (2013.01); *G06T 2207/30204* (2013.01)

(58) Field of Classification Search
CPC ............. G01D 5/34707; G01D 5/3473; G01D 5/34792; G05B 19/124; G06T 2207/30204; G06T 7/74; B25J 19/022; B25J 13/089; B25J 13/088; B25J 9/0009; B25J 9/044
See application file for complete search history.

(56) References Cited

U.S. PATENT DOCUMENTS

| | | | |
|---|---|---|---|
| 10,119,842 B1* | 11/2018 | Grossman | ............ G01D 5/264 |
| 2004/0218181 A1 | 11/2004 | Jones et al. | |
| 2007/0034788 A1* | 2/2007 | Igarashi | ............ G01D 5/34707 |
| | | | 250/231.13 |

(Continued)

FOREIGN PATENT DOCUMENTS

| | | |
|---|---|---|
| JP | 63-187118 A | 8/1988 |
| JP | 05-120436 A | 5/1993 |
| JP | 2004-333498 A | 11/2004 |

(Continued)

*Primary Examiner* — Georgia Y Epps
*Assistant Examiner* — Don J Williams
(74) *Attorney, Agent, or Firm* — Harness, Dickey & Pierce, P.L.C.

(57) ABSTRACT

An encoder includes a base portion, a rotation portion that is provided to be rotatable about a rotation axis with respect to the base portion, a mark that is disposed around the rotation axis on the rotation portion, an imaging element that is disposed in the base portion and images the marks, a storage portion that stores a reference image, and a determination portion that performs template matching on the mark imaged by the imaging element by using the reference image, so as to determine a rotation state of the rotation portion with respect to the base portion.

12 Claims, 11 Drawing Sheets

(56) References Cited

U.S. PATENT DOCUMENTS

2017/0274537 A1    9/2017  Kondo et al.
2017/0366802 A1*  12/2017  Hirasawa ............... G03B 17/12

FOREIGN PATENT DOCUMENTS

| JP | 2009-093412 A | 4/2009 |
| JP | 2009-301161 A | 12/2009 |
| JP | 2013-092519 A | 5/2013 |
| JP | 2017-177238 A | 10/2017 |

* cited by examiner

ENCODER, ROBOT, AND PRINTER

BACKGROUND

1. Technical Field

The present invention relates to an encoder, a robot, and a printer.

2. Related Art

An optical rotary encoder is generally known as one kind of encoder (for example, refer to JP-A-63-187118). For example, a rotary encoder is used for a robot provided with a robot arm having a rotatable joint, and detects rotation states such as a rotation angle, a rotation position, a number of rotations, and a rotation speed of the joint. The detection results are used for drive control of the joint, for example.

For example, the encoder disclosed in JP-A-63-187118 reads a code plate on which a numerical value pattern and a stripe pattern such as a gray code are formed with an imaging element, and detects a position on the basis of the read numerical value pattern and stripe pattern.

However, in the encoder disclosed in JP-A-63-187118, in order to realize high detection accuracy, a high definition pattern is required to be formed on a code plate, and, as a result, there is a problem of causing high cost. In the encoder disclosed in JP-A-63-187118, even if the high definition pattern is formed on the code plate, there is a problem in that the detection accuracy is considerably reduced in a case where the pattern is damaged by contamination or the like.

SUMMARY

An advantage of some aspects of the invention is to provide an encoder capable of increasing the detection accuracy while achieving low cost, and to provide a robot and a printer having the encoder.

The invention can be achieved by the following configurations.

An encoder according to an aspect of the invention includes a base portion; a rotation portion that is provided to be rotatable about a rotation axis with respect to the base portion; a mark that is disposed around the rotation axis on the rotation portion; an imaging element that is disposed in the base portion and images the marks; a storage portion that stores a reference image; and a determination portion that performs template matching on the mark imaged by the imaging element by using the reference image, so as to determine a rotation state of the rotation portion with respect to the base portion.

According to the encoder having the configuration, since a mark is recognized by using template matching, and a rotation state of the rotation portion with respect to the base portion is determined, it is possible to determine a rotation state of the rotation portion with respect to the base portion with high accuracy on the basis of a position of an image of the mark in a captured image obtained by the imaging element even if a high definition mark is not used. Even if the mark is damaged by contamination or the like, it is possible to detect a position of an image of the mark in a captured image obtained by the imaging element with high accuracy through template matching. Thus, it is possible to increase the detection accuracy while achieving low cost.

In the encoder according to the aspect of the invention, it is preferable that a plurality of the marks are disposed on the rotation portion, and the imaging element images both of the entire two marks adjacent to each other in a circumferential direction around the rotation axis.

With this configuration, even if one of the two marks imaged by the imaging element cannot be accurately read due to contamination or the like, the other mark can be read, and thus detection can be performed.

In the encoder according to the aspect of the invention, it is preferable that the determination portion sets a search region in a partial region of a captured image of the mark, and performs the template matching in the search region.

With this configuration, the number of pixels of the search region used for template matching can be reduced, and thus a calculation time related to the template matching can be reduced. Thus, even in a case where angular velocity of the rotation portion is high, it is possible to perform highly accurate detection. Even if distortion or blurring of an outer peripheral portion of the captured image in the imaging element increases due to aberration of the lens disposed between the imaging element and the marks, a region in which such distortion or blurring is small is used as the search region, and thus it is possible to minimize deterioration in the detection accuracy.

In the encoder according to the aspect of the invention, it is preferable that the determination portion can change at least one of a position and a length of the search region in a first direction in the captured image on the basis of angular velocity about the rotation axis among determination results of the past rotation state of the rotation portion.

With this configuration, a more useful search region corresponding to a rotation state (angular velocity) of the rotation portion can be set, and thus the number of pixels of the search region used for template matching can be further reduced.

In the encoder according to the aspect of the invention, it is preferable that the determination portion calculates the angular velocity on the basis of determination results of the past two or more rotation states.

With this configuration, it is possible to relatively easily set the search region corresponding to a rotation state (angular velocity) of the rotation portion.

In the encoder according to the aspect of the invention, it is preferable that the determination portion can change at least one of a position and a length of the search region in a first direction in the captured image on the basis of angular acceleration about the rotation axis among determination results of the past rotation state of the rotation portion.

With this configuration, a more useful search region corresponding to a change (angular acceleration) in a rotation state (angular velocity) of the rotation portion can be set.

In the encoder according to the aspect of the invention, it is preferable that the determination portion calculates the angular acceleration on the basis of determination results of the past three or more rotation states.

With this configuration, it is possible to relatively easily set the search region corresponding to a change (angular acceleration) in a rotation state (angular velocity) of the rotation portion.

In the encoder according to the aspect of the invention, it is preferable that the determination portion can change at least one of a position and a length of the search region in a second direction perpendicular to the first direction in the captured image on the basis of a position of the search region in the first direction in the captured image.

With this configuration, a more useful search region corresponding to a rotation state (rotation angle) of the rotation portion can be set, and thus the number of pixels of the search region used for template matching can be further reduced.

In the encoder according to the aspect of the invention, it is preferable that the determination portion can change an attitude of the reference image in the captured image on the basis of information regarding a rotation angle of the rotation portion with respect to the base portion.

With this configuration, in a case where a change in an attitude of an image of the mark in the search region is great, it is possible to increase the accuracy of template matching while reducing a calculation amount related to the template matching.

In the encoder according to the aspect of the invention, it is preferable that the determination portion determines whether or not a rotation angle of the rotation portion with respect to the base portion is larger than a set angle, and changes an attitude of the reference image in the captured image on the basis of a determination result.

With this configuration, it is possible to further reduce a calculation amount related to template matching while achieving high accuracy of the template matching.

A robot according to another aspect of the invention includes the encoder according to the aspect of the invention.

According to the robot having the configuration, since the encoder has high detection accuracy, it is possible to highly accurate operation control of the robot by using a detection result in the encoder. Since the encoder is cheap, it is also possible to achieve low cost of the robot.

A printer according to another aspect of the invention includes the encoder according to the aspect of the invention.

According to the printer having the configuration, since the encoder has high detection accuracy, it is possible to perform highly accurate operation control of the printer by using a detection result in the encoder. Since the encoder is cheap, it is also possible to achieve low cost of the printer.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an encoder, a robot, and a printer according to embodiments of the invention will be described in detail with reference to the accompanying drawings.

Robot

Figure 1:
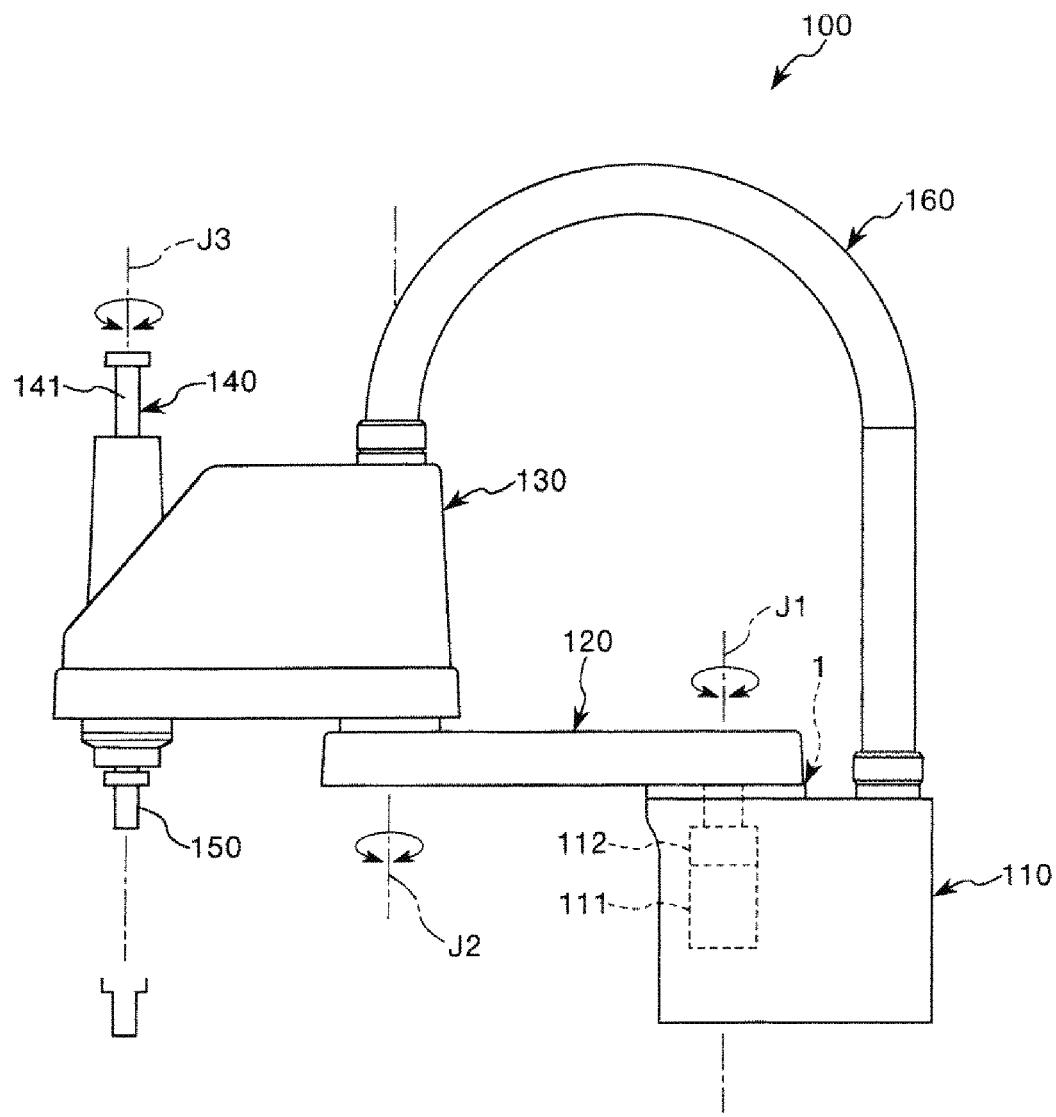
FIG. 1 is a side view illustrating a robot according to an embodiment of the invention.

FIG. 1 is a side view illustrating a robot of an embodiment of the invention. In the following description, for convenience of description, in FIG. 1, an upper part is referred to as an "upper side", and a lower part is referred to as a "lower side". In FIG. 1, a base side is referred to as a "basal end", and an opposite side (end effector side) thereto is referred to as a "distal end side". In FIG. 1, an upward-and-downward direction is referred to as a "vertical direction", and a leftward-and-rightward direction is referred to as a "horizontal direction".

A robot 100 illustrated in FIG. 1, which is a so-called horizontal articulated robot (scalar robot), is used for a manufacturing process of manufacturing, for example, precision equipment, and can perform holding or transport of the precision equipment or components.

As illustrated in FIG. 1, the robot 100 includes a base 110, a first arm 120, a second arm 130, a work head 140, an end effector 150, and a wiring routing portion 160. Hereinafter, the respective portions of the robot 100 will be described briefly in order.

The base 110 is fixed to, for example, a floor surface (not illustrated) via bolts or the like. The first arm 120 is connected to an upper end of the base 110. The first arm 120 is rotatable about a first axis J1 along the vertical direction with respect to the base 110.

The base 110 is provided with a first motor 111 which generates drive force for rotating the first arm 120, and a first decelerator 112 which reduces the driving force from the first motor 111. An input shaft of the first decelerator 112 is connected to a rotation shaft of the first motor 111, and an output shaft of the first decelerator 112 is connected to the first arm 120. Thus, if the first motor 111 is driven, and a driving force therefrom is forwarded to the first arm 120 via the first decelerator 112, the first arm 120 is rotated about the first rotation axis J1 in a horizontal plane with respect to the base 110.

The encoder 1 which is a first encoder detecting a state of the first arm 120 being rotated with respect to the base 110 is provided at the base 110 and the first arm 120.

A distal end of the first arm 120 is connected to the second arm 130. The second arm 130 is rotatable about a second axis J2 along the vertical direction with respect to the first arm 120. Although not illustrated, the second arm 130 is provided with a second motor which generates drive force for rotating the second arm 130, and a second decelerator which reduces the driving force from the second motor. The driving force from the second motor is forwarded to the first arm 120 via the second decelerator, and thus the second arm 130 is rotated about the second axis J2 in a horizontal plane with respect to the first arm 120. Although not illustrated, the second motor is provided with a second encoder which detects a state of the second arm 130 being rotated with respect to the first arm 120.

The work head 140 is disposed at a distal end of the second arm 130. The work head 140 includes a spline shaft 141 inserted into a spline nut and a ball screw nut (none illustrated) which are disposed in the same scale at the distal end of the second arm 130. The spline shaft 141 can be rotated about an axis thereof and can be moved up and down in the vertical direction, with respect to the second arm 130.

Although not illustrated, the second arm 130 is provided with a rotation motor and a lifting motor. If drive force from the rotation motor is forwarded to the spline nut via a drive force forwarding mechanism (not illustrated), and thus the spline nut is rotated in normal and reverse directions, the spline shaft 141 is rotated in the normal and reverse directions about an axis J3 along the vertical direction. Although not illustrated, the rotation motor is provided with a third encoder which detects a state of the spline shaft 141 being rotated with respect to the second arm 130.

On the other hand, if drive force from the lifting motor is forwarded to the ball screw nut via a drive force forwarding mechanism (not illustrated), and thus the ball screw nut is rotated in normal and reverse directions, the spline shaft 141 is moved up and down. The lifting motor is provided with a fourth encoder detecting a movement amount of the spline shaft 141 with respect to the second arm 130.

A distal end (lower end) of the spline shaft 141 is connected to the end effector 150. The end effector 150 is not particularly limited, and may employ, for example, an effector holding an object to be transported, or an effector processing an object to be processed.

A plurality of wires connected to the respective electronic components (for example, the second motor, the rotation motor, the lifting motor, and the second to fourth encoders) disposed in the second arm 130 are routed to the base 110 through the tubular wiring routing portion 160 which connects the second arm 130 to the base 110. The plurality of wires are collected inside the base 110, and are thus routed to a control device (not illustrated) which is provided outside the base 110 and generally controls the robot 100 along with wires connected to the first motor 111 and the encoder 1.

As mentioned above, a configuration of robot 100 has been described briefly. The robot 100 includes the encoder 1 of any one of a first to fifth embodiments which will be described later. The encoder 1 can achieve low cost, and also increase the detection accuracy. Thus, it is possible to perform highly accurate operation control of the robot 100 by using a detection result in the encoder 1. It is possible to achieve low cost of the robot 100.

Encoder

Hereinafter, the encoder 1 will be described in detail. Hereinafter, a description will be made of an example of a case where the encoder 1 is incorporated into the robot 100.

First Embodiment

Figure 2:
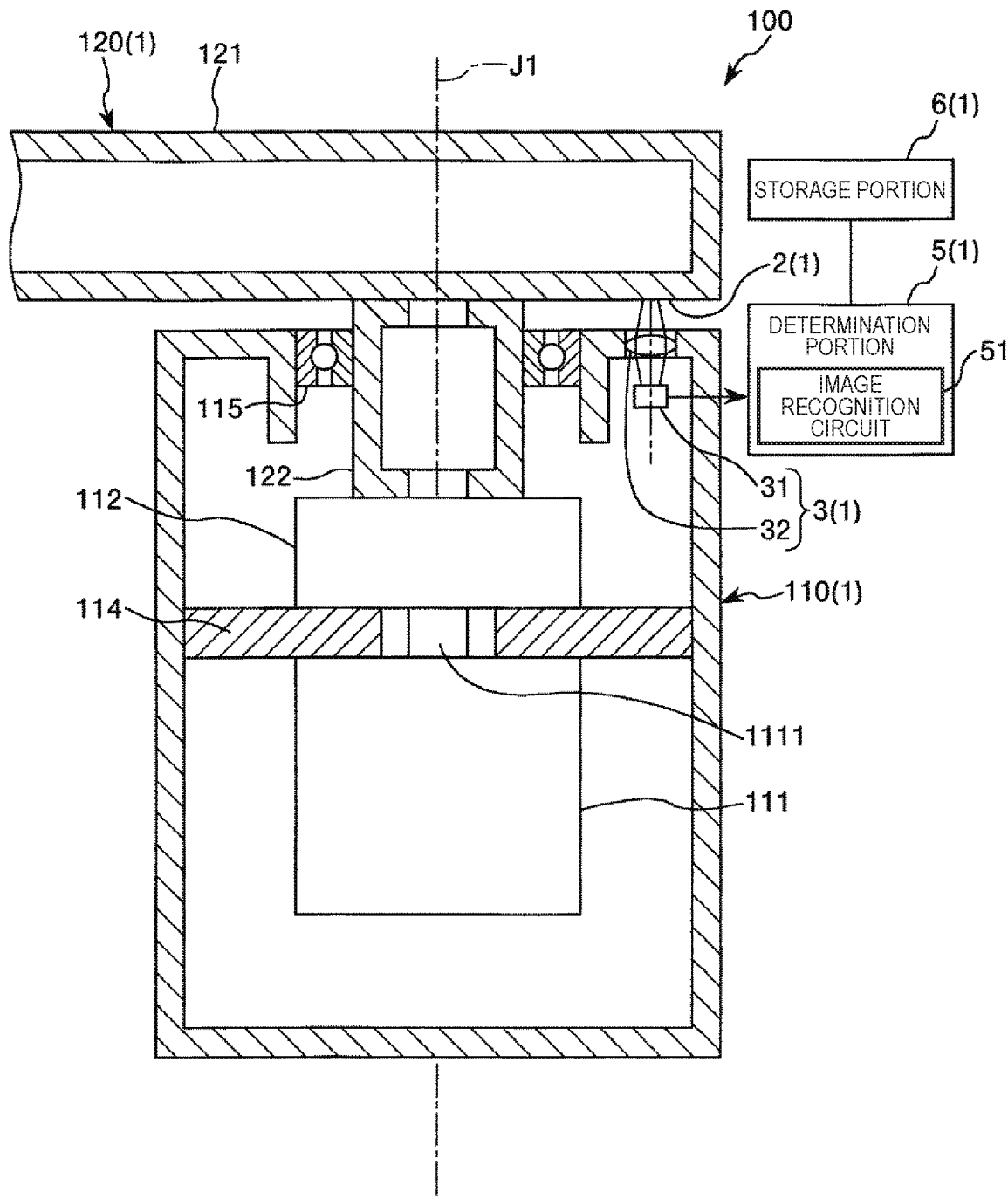
FIG. 2 is a sectional view for explaining an encoder according to a first embodiment of the invention.
Figure 3:
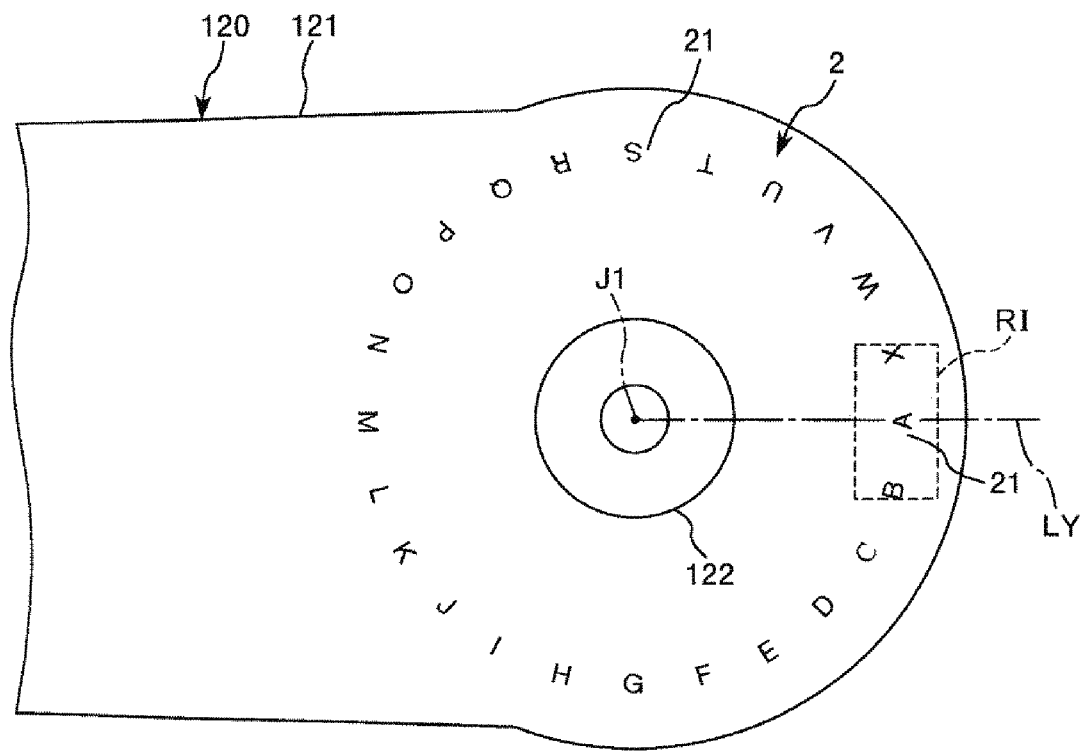
FIG. 3 is a diagram for explaining marks provided in the encoder illustrated in FIG. 2.

FIG. 2 is a sectional view for explaining an encoder according to a first embodiment of the invention. FIG. 3 is a diagram for explaining marks provided in the encoder illustrated in FIG. 2.

As illustrated in FIG. 2, the base 110 of the robot 100 includes a support member 114 supporting the first motor 111 and the first decelerator 112, and stores the first motor 111 and the first decelerator 112 therein. The base 110 is provided with the first arm 120 which is rotatable about the first axis J1.

The first arm 120 includes an arm main body portion 121 which extends along the horizontal direction, and a shaft portion 122 which protrudes downward from the arm main body portion 121, and the two portions are connected to each other. The shaft portion 122 is supported at the base 110 via a bearing 115 so as to be rotatable about the first axis J1, and is also connected to the output shaft of the first decelerator 112. The input shaft of the first decelerator 112 is connected to a rotation shaft 1111 of the first motor 111.

Here, the base 110 is a structural body to which a load based on the dead weight of the base 110 or the mass of other elements supported by the base 110 is applied. Similarly, the first arm 120 is also a structural body to which a load based on the dead weight of the first arm 120 or the mass of other elements supported by the first arm 120 is applied. Materials forming the base 110 and the first arm 120 are not particularly limited, and may employ, for example, metal materials.

In the present embodiment, outer surfaces of the base 110 and the first arm 120 form a part of an outer surface of the robot 100. Exterior members such as a cover and an impact absorbing material may be attached to the outer surfaces of the base 110 and the first arm 120.

The relatively rotated base 110 and first arm 120 are provided with the encoder 1 detecting rotation states thereof.

The encoder 1 includes a mark portion 2 provided at the first arm 120, a mark detection portion 3 provided at the base 110 and detecting the mark portion 2, a determination portion 5 determining relative rotation states of the base 110 and the first arm 120 on the basis of a detection result in the mark detection portion 3, and a storage portion 6 which is electrically connected to the determination portion 5.

The mark portion 2 is provided at a portion of the arm main body portion 121 facing the base 110, that is, a portion surrounding the shaft portion 122 on a lower surface of the arm main body portion 121. As illustrated in FIG. 3, the mark portion 2 has a plurality of marks 21 disposed around the first axis J1 at positions which are different from the first axis J1. Here, the marks 21 are provided on the surface of the first arm 120. Consequently, a member for providing the marks 21 is not required to be provided separately from the base 110 and the first arm 120. Thus, it is possible to reduce the number of components. The marks 21 are not limited to a case of being directly provided on the surface of the first arm 120, and may be provided on a sheet member adhered to the surface of the first arm 120, and may be provided on a tabular member which is provided to be rotated along with the first arm 120. In other words, a member (rotation portion) provided with the marks 21 may be a member which is rotated about the first axis J1 along with the first arm 120 with respect to the base 110.

In the present embodiment, as illustrated in FIG. 3, the plurality of marks 21 are a plurality of different position identification marks disposed to be arranged at an equal interval around the first axis J1. The plurality of marks illustrated in FIG. 3 are alphabetical letters (roman letters) which are different from each other, and twenty-four letters from A to X are disposed to be arranged at an equal interval in an alphabetical order in the circumferential direction. As a method of forming the marks 21, for example, laser marking, printing, cutting, or etching may be used.

The number and size of marks 21 may be determined depending on, for example, a necessary resolution, and a resolution of an imaging element 31 which will be described later, and are not limited to the illustrated example, and any number and size may be used. An interval between the plurality of marks 21 in the circumferential direction may not be equal. The marks 21 are not limited to the illustrated roman letters, and may use letters such as Arabic letters and Chinese letters, and may use, for example, symbols, signs, tokens, marks, design, and text other than letters. The marks 21 may not be necessarily identified by humans as long as the marks can be identified by the determination portion 5. For example, instead of the marks 21, a one-dimensional barcode or a QR code (registered trademark) may be used. Alternatively, the marks may be formed in completely random shapes without periodicity.

The mark detection portion 3 illustrated in FIG. 2 includes the imaging element 31 provided in the base 110, and a lens 32 provided in an opening of the base 110. The imaging element 31 images some (an imaging region RI illustrated in FIG. 3) of the marks 21 in the circumferential direction of the mark portion 2 via the lens 32. A light source which illuminates the imaging region RI of the imaging element 31 may be provided as necessary.

As the imaging element 31, for example, a charge coupled device (CCD) or a complementary metal oxide semiconductor (CMOS) may be used. The imaging element 31 converts a captured image into an electric signal for each pixel so as to output the electric signal. As the imaging element 31, a two-dimensional imaging element (area image sensor) or a one-dimensional imaging element (line image sensor) may be employed. The one-dimensional imaging element is preferably disposed in a direction in which arrangement of pixels is in contact with a turning circle of the arm. In a case where the two-dimensional imaging element is used, a two-dimensional image having a large amount of information can be acquired, and thus it becomes easier to increase the detection accuracy of the marks 21 using template matching which will be described later. As a result, it is possible to detect a rotation state of the first arm 120 with high accuracy. In a case where the one-dimensional imaging element is used, since an image acquisition cycle, that is, a so-called frame rate is high, it is possible to increase a detection frequency, and thus this is advantageous in terms of a high speed operation.

The lens 32 forms an image forming optical system. As the image forming optical system, any of an unimagnification optical system, an enlargement optical system, and a reduction optical system may be used. Here, as illustrated in FIG. 3, the imaging region RI of the imaging element 31 is set to overlap a part of the mark portion 2 in the circumferential direction on the lower surface of the first arm 120. Consequently, the imaging element 31 can image the mark 21 located in the imaging region RI. Therefore, the mark 21 located in the imaging region RI is read, and thus a rotation state of the first arm 120 can be understood.

The determination portion 5 illustrated in FIG. 2 determines relative rotation states of the base 110 and the first arm 120 on the basis of a detection result in the mark detection portion 3. The rotation states may include, for example, a rotation angle, a rotation speed, and a rotation direction.

Particularly, the determination portion 5 includes an image recognition circuit 51 which performs image recognition on the marks 21 by performing template matching on a captured image (captured image data) in the imaging element 31 by using a reference image (reference image data), and determines relative rotation states of the base 110 and the first arm 120 by using a recognition result in the image recognition circuit 51. Here, the determination portion 5 is configured to be able to more finely determine a relative rotation angle (hereinafter, also simply referred to as a "a rotation angle of the first arm 120") of the base 110 and the first arm 120 on the basis of a position of an image of the mark 21 in a captured image obtained by the imaging element 31. The determination portion 5 is configured to be able to obtain a rotation speed on the basis of a time interval at which the marks 21 are detected, or to determine a rotation direction on the basis of an order of the types of detected marks 21. The determination portion 5 outputs a signal corresponding to the above-described determination result, that is, a signal corresponding to a rotation state of the base 110 and the first arm 120. The signal is input to, for example, a control device (not illustrated), and is used to control an operation of the robot 100. At least a part of the determination portion 5 may be incorporated into the control device as hardware or software.

The determination portion 5 has a function of cutting out a part (a portion including the image of the mark 21) of the captured image obtained by the imaging element 31, so as to generate a reference image (template). The generation of a reference image is performed on each mark 21 before determining a relative rotation state of the base 110 and the first arm 120 or at an appropriate time as necessary. The generated reference image is stored in the storage portion 6 in correlation with each mark 21. The determination portion 5 performs template matching by using the reference image (template) stored in the storage portion 6. Template matching and a determination of a rotation state using the template matching will be described later in detail.

Here, the storage portion 6 stores the reference image (reference image data) along with information (identification information) regarding the type of mark 21 corresponding to the reference image, information regarding a coordinate (a coordinate of a reference pixel which will be described later) in the captured image, and information (angle information) regarding a rotation angle of the first arm 120, in correlation with each mark 21. As the storage portion 6, a nonvolatile memory and a volatile memory may be used, but the nonvolatile memory is preferably used from the viewpoint that a state of storing information can be held even if power is not supplied, and power can be saved.

As described above, the encoder 1 includes the base 110 which is a "base portion", the first arm 120 which is a "rotation portion" provided to be rotatable about the first axis J1 which is a "rotation axis" with respect to the base 110, the marks 21 which are disposed along the first axis J1 on the first arm 120, the imaging element 31 which is disposed on the base 110 and captures an image of the mark 21, and the determination portion 5 which detects the mark 21 by performing template matching on a captured image G in the imaging element 31 by using a reference image, and determines a rotation state of the first arm 120 with respect to the base 110 on the basis of a detection result thereof.

According to the encoder 1, since the mark 21 is recognized by using template matching, a rotation state of the first arm 120 with respect to the base 110 is determined, it is possible to determine a rotation state of the first arm 120 with respect to the base 110 with high accuracy on the basis of a position of an image of the mark 21 in a captured image obtained by the imaging element 31 even without using high definition marks 21. Even if the marks 21 are damaged by contamination or the like, it is possible to detect a position of an image of the mark 21 in a captured image obtained by the imaging element 31 with high accuracy through template matching. Thus, it is possible to increase the detection accuracy while achieving low cost. The "base portion" can be said to be a portion including the mark detection portion 3 of the base 110, and the "rotation portion" can be said to be a portion including the marks 21 of the first arm 120.

Template Matching and Determination of Rotation State using Template Matching.

Hereinafter, a detailed description will be made of template matching and a determination of a rotation state using template matching in the determination portion 5. Hereinafter, as an example, a description will be made of a case where a rotation angle is determined as a rotation state.

Acquisition of Reference Image

In the encoder 1, a reference image used for template matching is acquired before a rotation state of the first arm 120 with respect to the base 110 is determined by using template matching. The acquisition of a reference image may be performed only once before initial template matching, but may be performed at an appropriate timing as necessary thereafter. In this case, a reference image used for template matching may be updated to an acquired new reference image.

When a reference image is acquired, the first arm 120 is rotated about the first axis J1 with respect to the base 110 as appropriate, and an image of each mark 21 is captured by the imaging element 31 for the plurality of marks 21. Each obtained captured image is trimmed, and thus a reference image of each mark 21 is generated. The generated reference image is stored in the storage portion 6 along with and in correlation with identification information thereof, pixel coordinate information, and angle information. Hereinafter, this will be described in detail with reference to FIG. 4.

Figure 4:
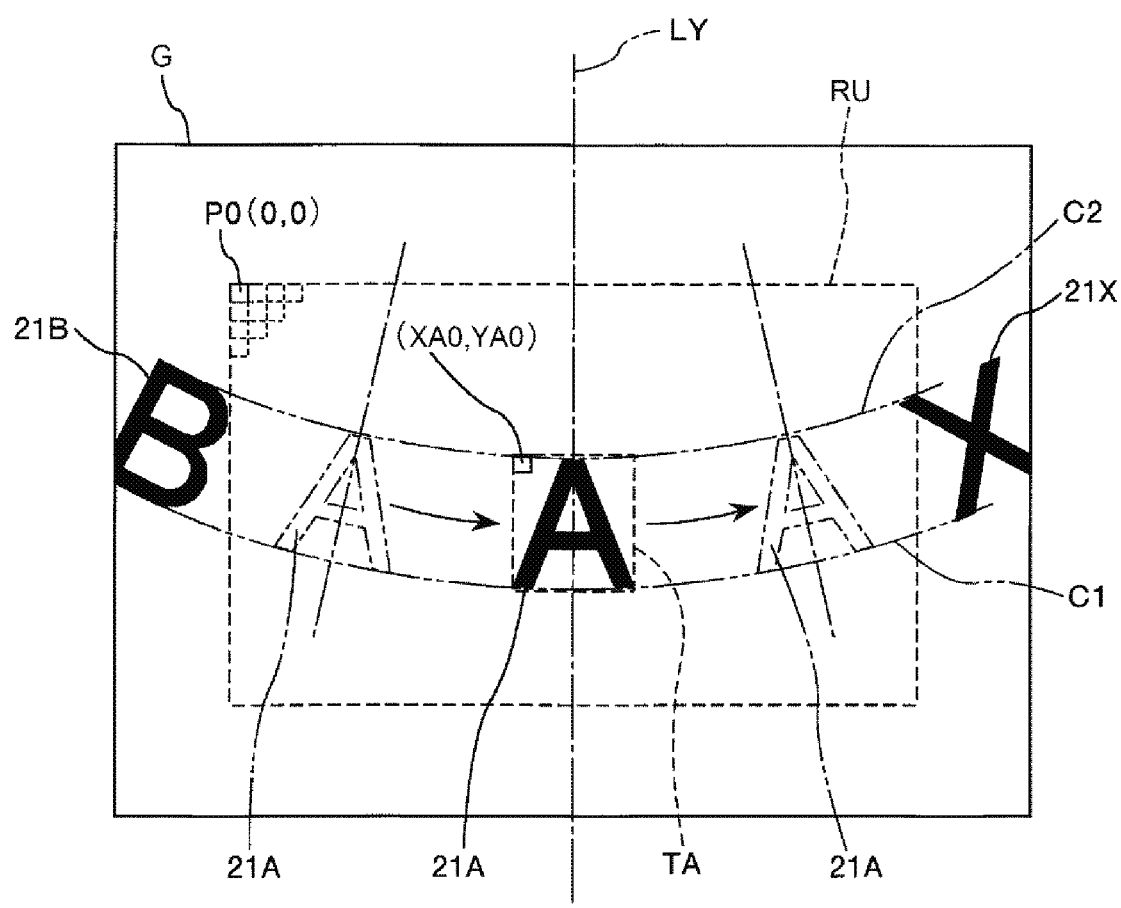
FIG. 4 is a diagram for explaining a captured image obtained by an imaging element provided in the encoder illustrated in FIG. 2.

FIG. 4 is a diagram for explaining a captured image obtained by the imaging element provided in the encoder illustrated in FIG. 2.

If the first arm 120 is rotated about the first axis with respect to the base 110, for example, as illustrated in FIG. 4, a mark image 21A which is an image of the mark 21 indicating the letter "A" reflected in the captured image G in the imaging element 31 is moved along circular arcs C1 and C2 in the captured image G. Here, the circular arc C1 is a trajectory drawn by a lower end of the mark image 21A in FIG. 4 due to rotation of the first arm 120 with respect to the base 110, and the circular arc C2 is a trajectory drawn by an upper end of the mark image 21A in FIG. 4 due to rotation of the first arm 120 with respect to the base 110. FIG. 4 illustrates a case where a mark image 21B which is an image of the mark 21 indicating the letter "B" and a mark image 21X which is an image of the mark 21 indicating the letter "X" are reflected in the captured image G in addition to the mark image 21A.

Here, the captured image G obtained through imaging in the imaging element 31 has a shape corresponding to the imaging region RI, and has a rectangular shape having two sides extending in an X axis direction and two sides extending in a Y axis direction. The two sides of the captured image G in the X axis direction are disposed along the circular arcs C1 and C2 if at all possible. The captured image G has a plurality of pixels arranged in a matrix form in the X axis direction and the Y axis direction. Here, a position of a pixel is expressed by a pixel coordinate system (X,Y) indicated by "X" indicating a position of the pixel in the X axis direction and "Y" indicating a position of the pixel in the Y axis direction. A central region excluding an outer periphery of the captured image G is set as an effective visual field region RU, and a pixel at an upper left end of the figure in the effective visual field region RU is set as an origin pixel (0,0) of the pixel coordinate system (X, Y).

In a case where a reference image TA for detecting the mark 21 indicating the letter "A" is generated, the first arm 120 is rotated with respect to the base 110 as appropriate, and the mark image 21A is located at a predetermined position (in FIG. 4, on a central line LY set at the center in the X axis direction) in the effective visual field region RU. Here, a rotation angle $\theta A0$ of the first arm 120 with respect to the base 110 of when the mark image 21A is located at the predetermined position is acquired in advance through measurement or the like.

The captured image G is trimmed in a rectangular pixel range as a required minimum range including the mark image 21A, and thus the reference image TA (a template for detection of the mark 21 indicating the letter "A") is obtained. The obtained reference image TA is stored in the storage portion 6. In this case, the reference image TA is stored along with and in correlation with identification information regarding the type of image (in FIG. 4, the letter "A"), angle information regarding the rotation angle $\theta A0$, and pixel information regarding a reference pixel coordinate (XA0,YA0) which is a pixel coordinate of a reference pixel (in FIG. 4, the pixel at the upper left end) in the pixel range of the reference image TA. In other words, the reference image TA, and the identification information, the angle information, and the pixel coordinate information correlated therewith are a single template set used for template matching.

Determination of Rotation State Using Template Matching

Next, with reference to FIGS. 5 to 8, a description will be made of template matching using the reference image TA generated as described above and determination of a rotation state using the template matching.

Figure 5:
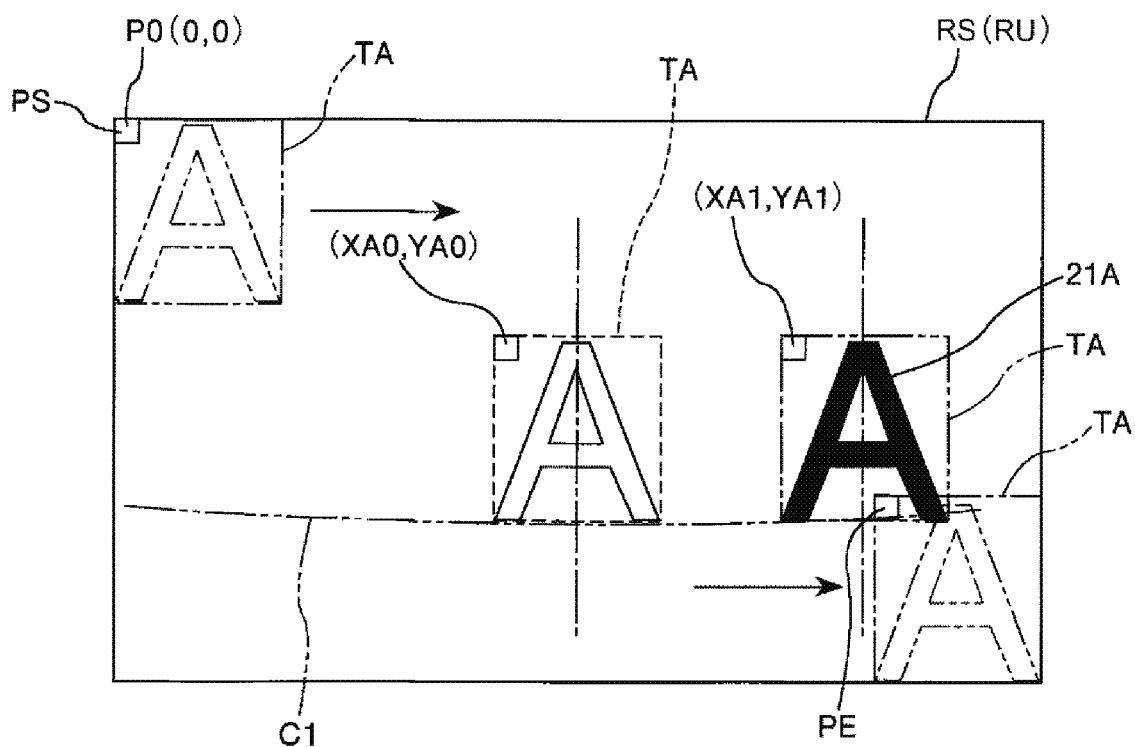
FIG. 5 is a diagram for explaining template matching in a search region set in the captured image illustrated in FIG. 4.
Figure 6:
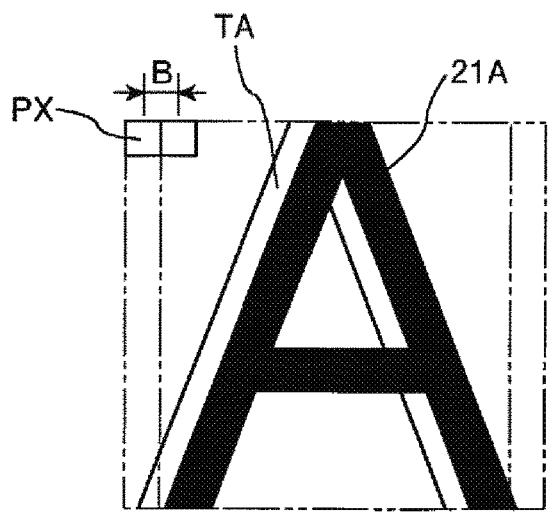
FIG. 6 is a diagram illustrating a state in which a correlation value is deviated by one pixel from a state in which the correlation value is the maximum or the minimum during template matching.
Figure 7:
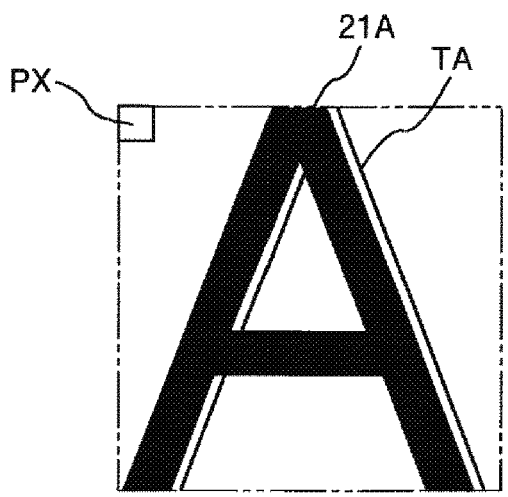
FIG. 7 is a diagram illustrating a state in which a correlation value is the maximum or the minimum during template matching.
Figure 8:
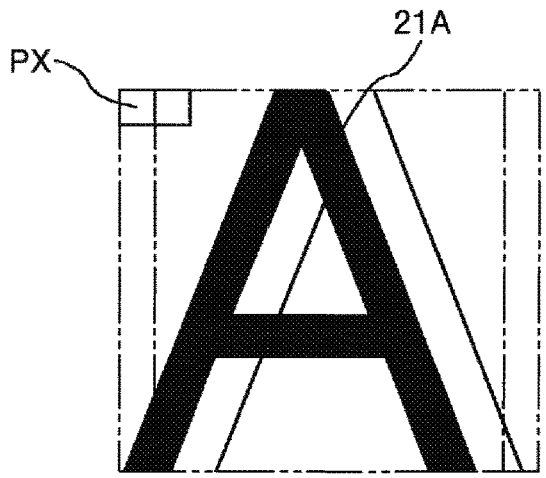
FIG. 8 is a diagram illustrating a state in which a correlation value is deviated by one pixel toward an opposite side to the state illustrated in FIG. 6 from a state in which the correlation value is the maximum or the minimum during template matching.

FIG. 5 is a diagram for explaining template matching in a search region set in the captured image illustrated in FIG. 4. FIG. 6 is a diagram illustrating a state in which a correlation value is deviated by one pixel from a state in which the correlation value is the maximum or the minimum during template matching. FIG. 7 is a diagram illustrating a state in which a correlation value is the maximum or the minimum during template matching. FIG. 8 is a diagram illustrating a state in which a correlation value is deviated by one pixel toward an opposite side to the state illustrated in FIG. 6 from a state in which the correlation value is the maximum or the minimum during template matching.

As illustrated in FIG. 5, when the mark image 21A is present in the effective visual field region RU, template matching is performed on an image of the effective visual field region RU by using the reference image TA. In the present embodiment, the entire effective visual field region RU is set as a search region RS, the reference image TA overlaps the search region RS, and a correlation value of an overlapping portion between the search region RS and the reference image TA is calculated while deviating the reference image TA by one pixel with respect to the search region RS. Here, a pixel coordinate of the reference pixel of the reference image TA is moved by one pixel from a start coordinate PS (origin pixel P0) to an end pixel PE, and a correlation value of an overlapping portion between the search region RS and the reference image TA is calculated for each pixel coordinate of the reference pixel of the reference image TA with respect to the pixels of the entire search region RS. The correlation value is stored in the storage portion 6 in correlation with the pixel coordinate of the reference pixel of the reference image TA as correlation value data between captured image data and reference image data.

The maximum correlation value is selected from among the plurality of correlation values for each pixel coordinate stored in the storage portion 6, and a pixel coordinate (XA1,YA1) of the reference image TA having the selected correlation value is determined as a pixel coordinate of the mark image 21A. In the above-described way, it is possible to detect a position of the mark image 21A in the captured image G.

Particularly, a pixel coordinate of the mark image 21A is obtained by using a subpixel estimation method. As illustrated in FIGS. 6 to 8, the reference image TA overlaps the mark 21 in the vicinity of the maximum correlation value. In the state illustrated in FIG. 7, a correlation value is greater than in the states (states of being deviated by one pixel from the state illustrated in FIG. 7) illustrated in FIGS. 6 and 8, and the correlation value is greatest. However, as in the state illustrated in FIG. 7, in a case where the reference image TA does not completely match the mark 21, and overlaps the mark 21 so as to be deviated therefrom, if it is determined that the state illustrated in FIG. 7 is determined as being a pixel position of the mark image 21A, a difference therebetween is an error. The difference is a visual field size B to the maximum. In other words, in a case where the subpixel estimation method is not used, the visual field size B is the minimum resolution (accuracy). In contrast, if the subpixel estimation method is used, a correlation value for each visual field size B can be fitted with a parabola (an equal-angle line may also be used), and thus such an inter-correlation value (inter-pixel pitch) can be complemented (approximated). Thus, it is possible to obtain a pixel coordinate of the mark image 21A with higher accuracy. In the above description, as an example, a description has been made of a case where a pixel coordinate at which a correlation value is the maximum is used for a pixel position of the mark image 21A, but template matching may be performed such that a pixel coordinate at which a correlation value is the minimum is used for a pixel position of the mark image 21A.

As mentioned above, the determination portion 5 sets the search region RS in the effective visual field region RU which is a partial region of the captured image G, and template matching is performed within the search region RS. Consequently, the number of pixels of the search region RS used for template matching can be reduced, and thus a calculation time related to the template matching can be reduced. Thus, even in a case where angular velocity of the first arm 120 about the first axis J1 is high, it is possible to perform highly accurate detection. Even if distortion or blurring of the outer peripheral portion of the captured image G increases due to aberration of the lens 32 disposed between the imaging element 31 and the marks 21, a region in which such distortion or blurring is small is used as the search region RS, and thus it is possible to minimize deterioration in the detection accuracy. Generation of the reference image TA and template matching may be performed by using the entire region of the captured image G, and, in this case, correction is preferably performed by taking aberration into consideration as necessary.

In the present embodiment, since a distance between the imaging region RI and the first axis J1 is sufficiently long, each of the circular arcs C1 and C2 can be approximated to a substantially straight line in the captured image G. Therefore, a movement direction of the mark image 21A in the captured image G may be considered to match the X axis direction.

Therefore, the mark image 21A is located at a position deviated by the number of pixels (XA1-XA0) in the X axis direction with respect to the reference image TA located at the reference pixel coordinate (XA0, YA0). Therefore, in a case where a distance between the center of the imaging region RI and the first axis J1 is indicated by r, and a width (a visual field size per pixel of the imaging element 31) of a region on the imaging region RI in the X axis direction, corresponding to one pixel of the imaging element 31 is indicated by W, a rotation angle θ of the first arm 120 with respect to the base 110 may be obtained by using Equation (1) as follows.

$$\theta = \theta A0 + \frac{(XA1 - XA0) \times W}{2r\pi} \times 360[°] \quad (1)$$

In Equation (1), (XA1−XA0)×W corresponds to a distance between an actual position corresponding to the reference pixel coordinate (XA0,YA0) of the reference image TA and an actual position corresponding to the pixel coordinate (XA1,YA1) of the reference image TA at which the above-described correlation value is the maximum. 2rπ corresponds to a length of a trajectory of the mark 21 (a length of a circumference) of when the first arm 120 is rotated by 360° with respect to the base 110. θA0 indicates a rotation angle of the first arm 120 with respect to the base 110 of when the mark image 21A is located at a predetermined position as described above. The rotation angle θ is an angle by which the first arm 120 is rotated from a reference state (0°) with respect to the base 110.

In a case where the rotation angle θ is obtained as mentioned above, a so-called subpixel estimation method may be used in which a correlation value of a pixel adjacent to the pixel coordinate (XA1,YA1) is fitted with a parabola or a parabolic curved surface, and thus a coordinate of the maximum correlation value is determined. Consequently, a position of the mark image 21A in the captured image G can be obtained in a finer resolution than in the pixel unit, and, as a result, it is possible to increase the detection accuracy of the rotation angle θ.

The above-described template matching and calculation of the rotation angle θ using the template matching are also performed on other marks 21 (other than the mark 21 indicating the letter "A") in the same manner. Here, a reference image corresponding to each mark 21 is registered such that at least one of the marks 21 is reflected without being omitted in the effective visual field region RU, and template matching can be performed, with respect to any rotation angle θ. Consequently, it is possible to prevent the occurrence of an angle range in which template matching cannot be performed.

In FIG. 4 described above, the marks 21 and the effective visual field region RU are configured such that a single mark 21 is reflected without being omitted in the effective visual field region RU with respect to any rotation angle θ, but the marks 21 and the effective visual field region RU are preferably configured such that a plurality of marks 21 are reflected without being omitted in the effective visual field region RU with respect to any rotation angle θ. In this case, template matching is performed by using two or more reference images corresponding to two or more marks 21 adjacent to each other such that the template matching can be performed on the plurality of marks 21 reflected in the effective visual field region RU with respect to any rotation angle θ. In this case, the two or more reference images may partially overlap each other.

In other words, preferably, a plurality of marks 21 are disposed on the first arm 120 (rotation portion), and the whole two marks 21 adjacent to each other in the circumferential direction around the first axis J1 (rotation axis) are included and imaged by the imaging element 31. Consequently, even if one of the two marks 21 imaged by the imaging element 31 cannot be accurately read due to contamination or the like, the other mark 21 can be read, and thus detection can be performed. Thus, there is an advantage in which it becomes easier to ensure high detection accuracy.

Second Embodiment

Figure 9:
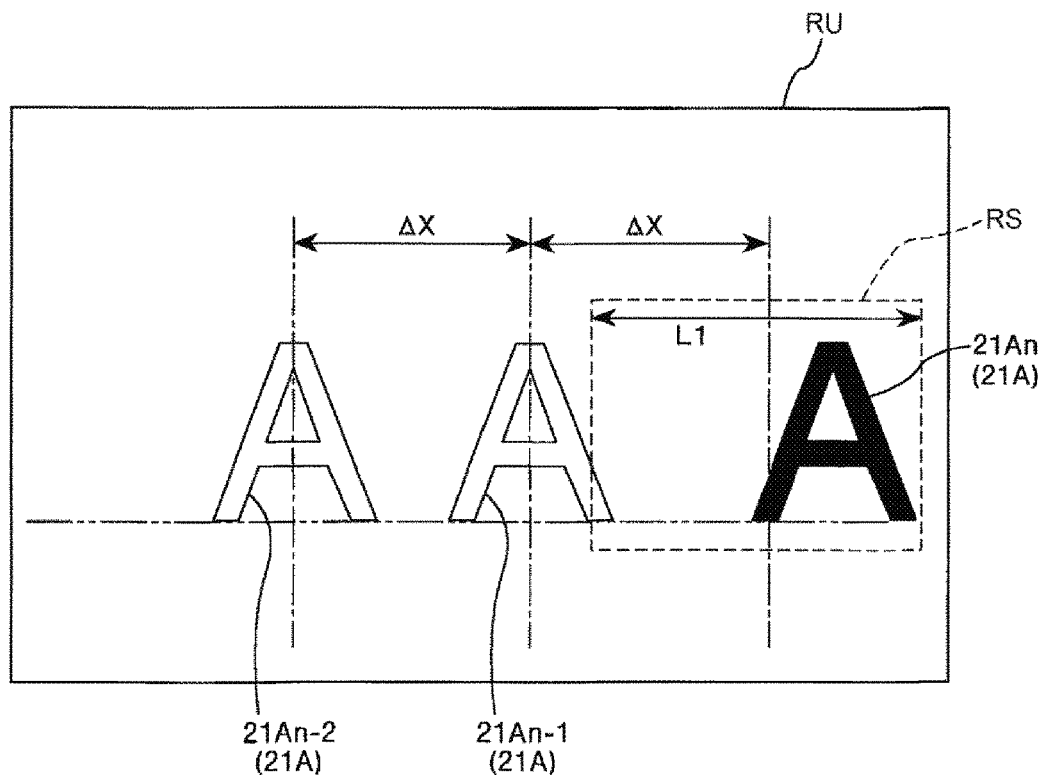
FIG. 9 is a diagram for explaining a search region (a region set by taking into consideration angular velocity of a rotation portion) in an encoder according to a second embodiment of the invention.
Figure 10:
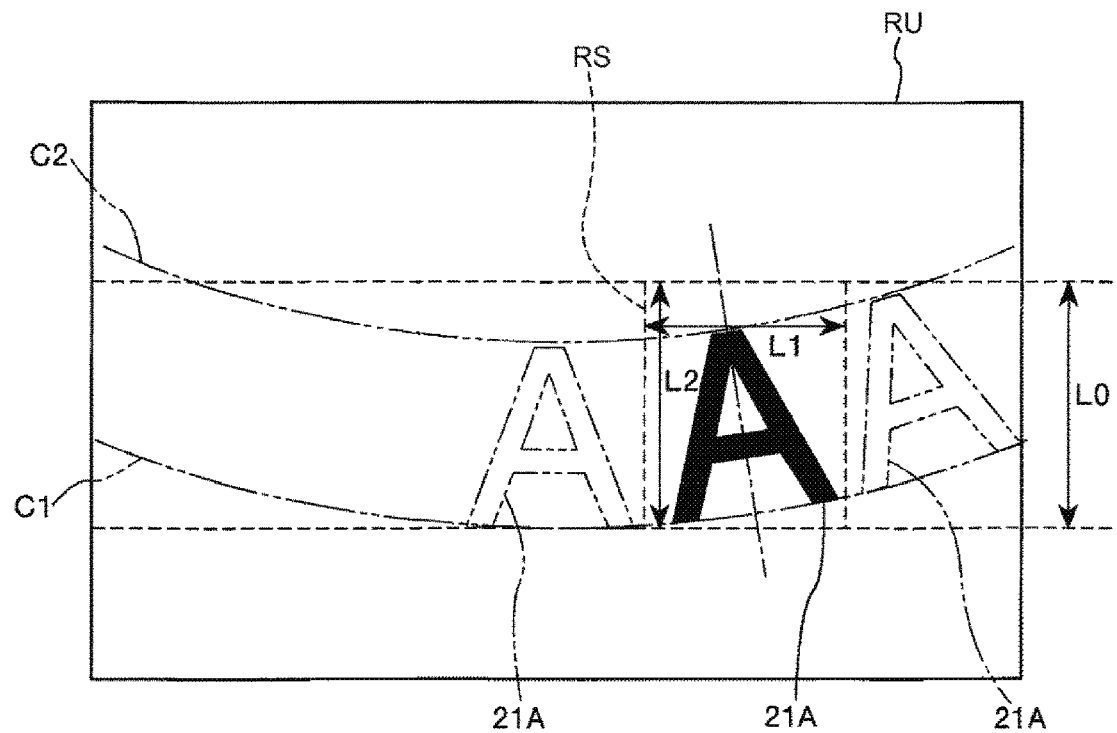
FIG. 10 is a diagram for explaining the search region (a region set by taking into consideration a movement trajectory of a mark) illustrated in FIG. 9.

FIG. 9 is a diagram for explaining a search region (a region set by taking into consideration angular velocity of a rotation portion) in an encoder according to a second embodiment of the invention. FIG. 10 is a diagram for explaining the search region (a region set by taking into consideration a movement trajectory of a mark) illustrated in FIG. 9.

Hereinafter, the second embodiment will be described focusing on a difference from the above-described embodiment, and a description of the same content will be omitted.

The present embodiment is the same as the above-described first embodiment except for a setting range of a search region.

In the first embodiment, the entire region of the effective visual field region RU is set as the search region RS. In other words, in the first embodiment, correlation values are calculated by performing template matching on pixels of the entire region of the effective visual field region RU. Here, a calculation time required for determination of the rotation angle θ using template matching is proportionate to the number of pixels of the search region RS. A pixel coordinate required to obtain the rotation angle θ is only a pixel coordinate at which a correlation value is the maximum (a pixel coordinate adjacent thereto is also necessary in a case where subpixel estimation is used). Therefore, in the first embodiment, most of the calculation time is used for useless calculation depending on cases.

Therefore, in the present embodiment, a position at which the mark 21 is reflected in the next imaging is predicted by using the past change over time of the rotation angle θ, and only a pixel region restricted to the vicinity of the position is set as the search region RS. The search region RS is set in the above-described way, and thus it is possible to considerably reduce a calculation amount regarding template matching and also to considerably reduce a calculation time.

Specifically, the determination portion 5 stores information regarding a determination result of the rotation angle θ in the storage portion 6 in correlation with each mark 21. The determination portion 5 sets (updates) a position and a range of the search region RS by using the information regarding the past determination result (rotation angle θ) stored in the storage portion 6.

More specifically, in a case where a time interval of imaging timings of the imaging element 31 is constant, when the rotation angle θ determined by imaging the mark 21 (in FIG. 9, the mark 21 indicating the letter "A") in the previous time is indicated by θ11, the rotation angle θ determined by imaging the mark 21 in the second previous time is indicated by θ12, and a predicted rotation angle of the rotation angle θ determined by imaging the mark 21 this time is indicated by θ14, if a rotation speed (angular velocity) of the first arm 120 with respect to the base 110 is constant, θ11, θ12, and θ14 are expressed by Equation (2) as follows.

$$\theta 14 = \theta 11 + (\theta 11 - \theta 12) \quad (2)$$

Here, as illustrated in FIG. 9, Equation (2) indicates that an inter-center distance between a mark image 21An-1 which is the mark image 21A obtained in the previous imaging and a mark image 21An which is the mark image 21A obtained in the present imaging is the same as an inter-center distance ΔX between a mark image 21An-2 which is the mark image 21A obtained in the second previous imaging and the mark image 21An-1 which is the mark image 21A obtained in the previous imaging. However, actually, since a rotation speed (angular velocity) of the first arm 120 with respect to the base 110 generally changes, when a change amount is indicated by Δθ, and the present actual rotation angle θ is indicated by θ13, θ13 is expressed by Equation (3) as follows.

$$\theta 13 = \theta 14 \pm 40 \quad (3)$$

Here, if the maximum value of Δθ is known, the maximum value is used as 40, and thus a range of θ13 can be uniquely determined. If θ14 is determined, a deviation (θ14−θA0) from the rotation angle θA0 which is angle information of the reference image TA present in the effective visual field region RU can also be determined. Since the rotation angle θA0 is known, it can be predicted in which pixel range of the effective visual field region RU the mark image 21A matching the reference image TA is located on the basis of the deviation (θ14−θA0).

Since θ13 has a width of the change amount Δθ, a pixel range L1 of the search region RS in the X axis direction is a range obtained by adding at least pixels corresponding to the width of the change amount Δθ to the pixel range corresponding to the reference image TA with θ14 as a reference.

A pixel range of the search region RS in the Y axis direction may be the entire region of the effective visual field region RU in the Y axis direction in the same manner as in the first embodiment, but a pixel range of the reference image TA in the Y axis direction or a range slightly larger than that in a case where trajectories (circular arcs C1 and C2) in which the mark image 21A is moved in the effective visual field region RU can be regarded as a straight line. In a case where the circular arcs C1 and C2 in the effective visual field region RU are not regarded as straight lines, as illustrated in FIG. 10, a pixel range L2 of the search region RS in the Y axis direction is set in the pixel range L0 (maximum range) of the circular arcs C1 and C2 in the Y axis direction in the effective visual field region RU.

The search region RS is set in the above-described way, and, thus, even if a positional change of the mark image 21A in the Y axis direction in the effective visual field region RU increases, an appropriate search region RS can be set. A pixel range of the search region RS in the Y axis direction is set to a part of the effective visual field region RU in the Y axis direction, and thus it is possible to considerably reduce a calculation amount regarding template matching. Here, since template matching in the search region RS is preferably performed mainly in the X axis direction in a unidimensional manner unlike typical template matching in which an image is searched relatively widely in a two-dimensional manner, only a calculation amount of a half or less of that in the typical template matching is necessary.

As mentioned above, in the present embodiment, the determination portion 5 can change at least one of a position and a length of the search region RS in the X axis direction which is a "first direction" in the captured image G on the basis of information regarding angular velocity about the first axis J1 (rotation axis) among determination results of the past rotation states of the first arm 120 (rotation portion). Consequently, a more useful search region RS corresponding to a rotation state (angular velocity) of the first arm 120 can be set, and thus the number of pixels of the search region RS used for template matching can be further reduced.

Here, the determination portion 5 calculates information regarding angular velocity about the first axis J1 of the first arm 120 (rotation portion) with respect to the base 110 (base portion) on the basis of determination results of the past two or more rotation angles θ (rotation states). Consequently, it is possible to relatively easily set the search region RS corresponding to a rotation state (angular velocity) of the first arm 120.

According to the second embodiment described above, it is also possible to increase the detection accuracy while achieving low cost.

Third Embodiment

Figure 11:
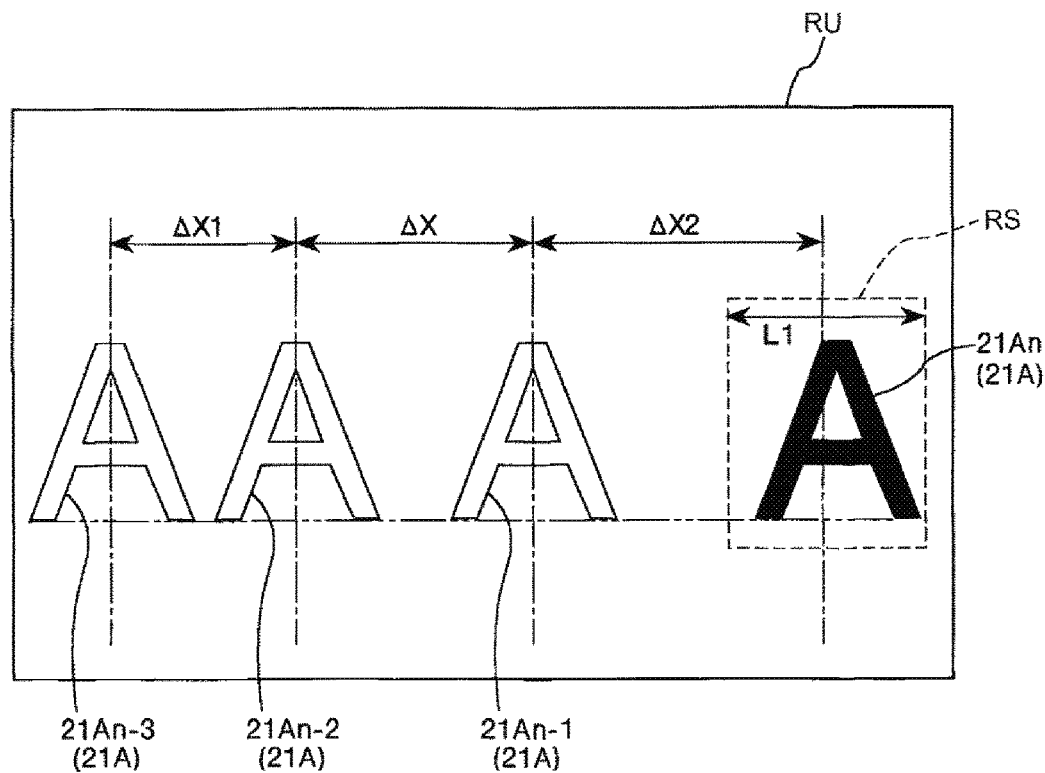
FIG. 11 is a diagram for explaining a search region (a region set by taking into consideration angular velocity and angular acceleration of a rotation portion) in an encoder according to a third embodiment of the invention.

FIG. 11 is a diagram for explaining a search region (a region set by taking into consideration angular velocity and angular acceleration of a rotation portion) in an encoder according to a third embodiment of the invention.

Hereinafter, the third embodiment will be described focusing on a difference from the above-described embodiments, and a description of the same content will be omitted.

The present embodiment is the same as the above-described first embodiment except for a setting range of a search region.

In the second embodiment, when the search region RS is set, only the immediately previous angular velocity of the first arm 120 predicted on the basis of information regarding the past two rotation angles θ (θ11 and θ12), and thus it is necessary to set the search region RS having a size in which the maximum value of the change amount Δθ of the angular velocity is taken into consideration.

In the present embodiment, when the search region RS is set, information regarding the past three or more rotation angles θ is used. Consequently, angular acceleration can also be predicted with simple computation in addition to angular velocity of the first arm 120. If the angular acceleration is used as mentioned above, Δθ in the above Equation (3) is uniquely defined, and thus θ13 can also be determined as a single value. The determined θ13 is only an expected value, and thus it is necessary to obtain the actual rotation angle θ with high accuracy by performing template matching.

For example, as illustrated in FIG. 11, in a case where the inter-center distance ΔX between a mark image 21A*n*-1 which is the mark image 21A obtained in the previous ((n−1)-th) imaging and a mark image 21A*n*-2 which is the mark image 21A obtained in the second previous ((n−2)-th) imaging is larger than an inter-center distance ΔX1 between the mark image 21A*n*-2 which is the mark image 21A obtained in the second previous ((n−2)-th) imaging and a mark image 21A*n*-3 which is the mark image 21A obtained in the third previous ((n−3)-th) imaging, an inter-center distance ΔX2 between the mark image 21A*n*-1 obtained in the previous imaging and a mark image 21A*n* which is the mark image 21A obtained in the present imaging is larger than the inter-center distance ΔX.

As mentioned above, in the present embodiment, the determination portion 5 can change at least one of a position and a length of the search region RS in the X axis direction which is a "first direction" in the captured image on the basis of information regarding angular acceleration about the first axis J1 (rotation axis) among determination results of the past rotation states of the first arm 120 (rotation portion). Consequently, a more useful search region RS corresponding to a change (angular acceleration) in a rotation state (angular velocity) of the first arm 120 can be set.

Here, the determination portion 5 calculates information regarding angular acceleration about the first axis J1 of the first arm 120 (rotation portion) with respect to the base 110 (base portion) on the basis of determination results of the past three or more rotation angles θ (rotation states). Consequently, it is possible to relatively easily set the search region RS corresponding to a change (angular acceleration) in a rotation state (angular velocity) of the first arm 120.

According to the third embodiment described above, it is also possible to increase the detection accuracy while achieving low cost.

Fourth Embodiment

Figure 12:
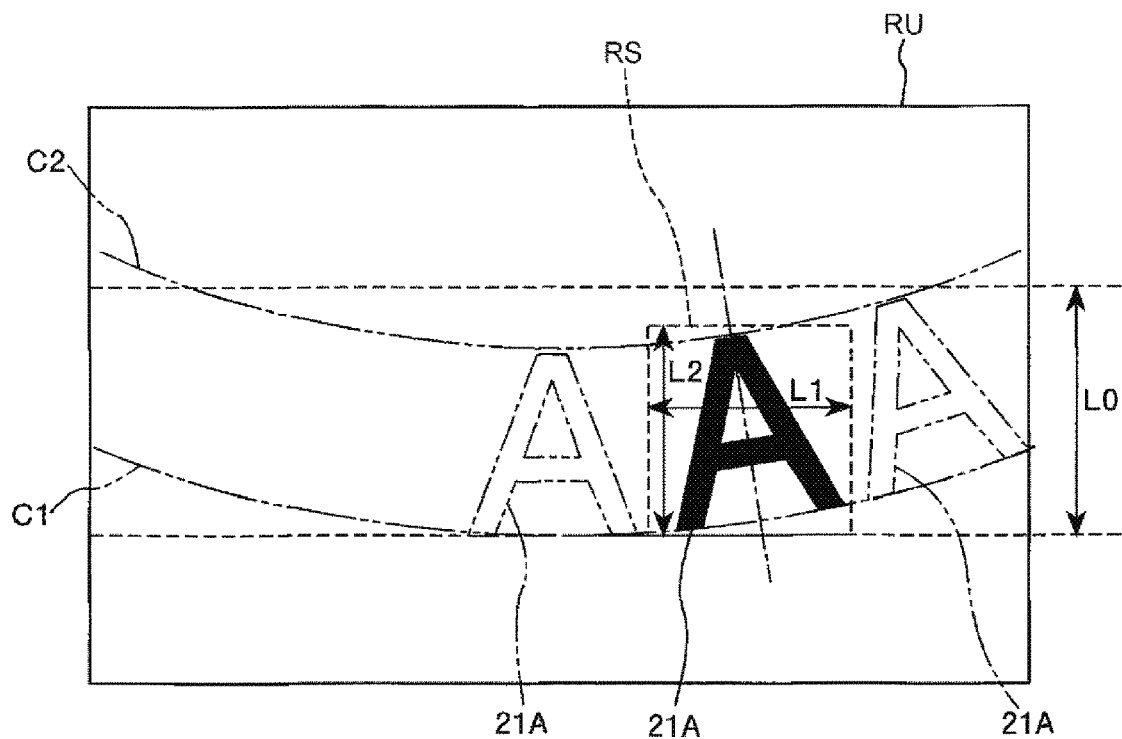
FIG. 12 is a diagram for explaining a search region (a region set by taking into consideration a rotation angle of a rotation portion) in an encoder according to a fourth embodiment of the invention.

FIG. 12 is a diagram for explaining a search region (a region set by taking into consideration a rotation angle of a rotation portion) in an encoder according to a fourth embodiment of the invention.

Hereinafter, the fourth embodiment will be described focusing on a difference from the above-described embodiments, and a description of the same content will be omitted.

The present embodiment is the same as the above-described first embodiment except for a setting range of a search region.

The above-described circular arcs C1 and C2 can be obtained through computation on the basis of the distance r between the center of the imaging region RI and the first axis J1, and the distance r can be understood in advance by performing imaging in the imaging element 31 while rotating the first arm 120 although an accurate value of the distance r is not obtained. If the circular arc C1 or C2 is known in advance, the above-described rotation angle θ13 is obtained, and then a pixel range which is larger than a pixel size of the reference image TA by a predetermined range can be set as the search region RS by using a pixel coordinate corresponding to the rotation angle θ13 on the circular arc C1 or C2 as a predicted pixel coordinate (predicted position) of the mark image 21A. In this case, the pixel range L2 of the search region RS in the Y axis direction can be reduced to the minimum (for example, to the extent to which a pixel size of the reference image TA is enlarged to each of upper and lower sides by one pixel). Consequently, it is possible to further reduce the number of pixels of the search region RS, and thus to reduce a calculation amount.

As mentioned above, in the present embodiment, the determination portion 5 can change at least one of a position and a length of the search region RS in the Y axis direction (second direction) which is perpendicular to the X axis direction in the captured image G on the basis of a position of the search region RS on the X axis (first direction) in the captured image G. Consequently, a more useful search region RS corresponding to a rotation state (rotation angle) of the first arm 120 can be set, and thus the number of pixels of the search region RS used for template matching can be further reduced.

According to the fourth embodiment described above, it is also possible to increase the detection accuracy while achieving low cost.

Fifth Embodiment

Figure 13:
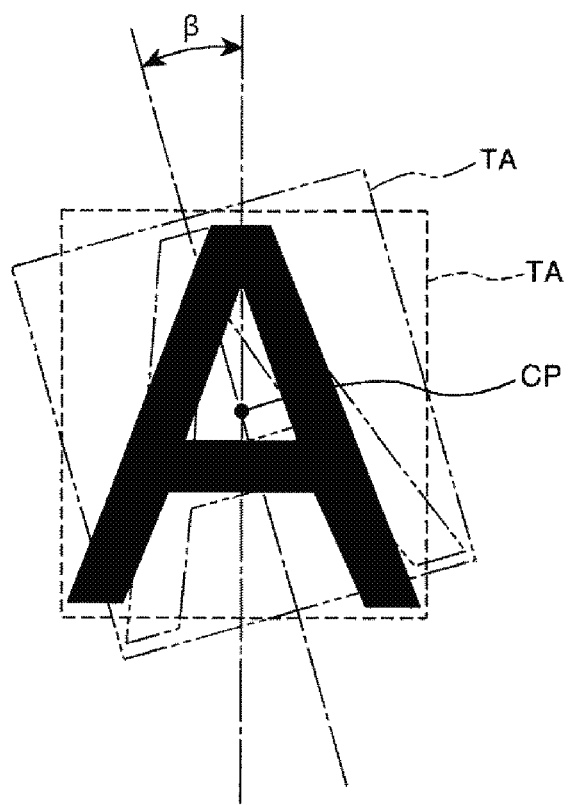
FIG. 13 is a diagram for explaining a reference image (template) in a search region in an encoder according to a fifth embodiment of the invention.
Figure 14:
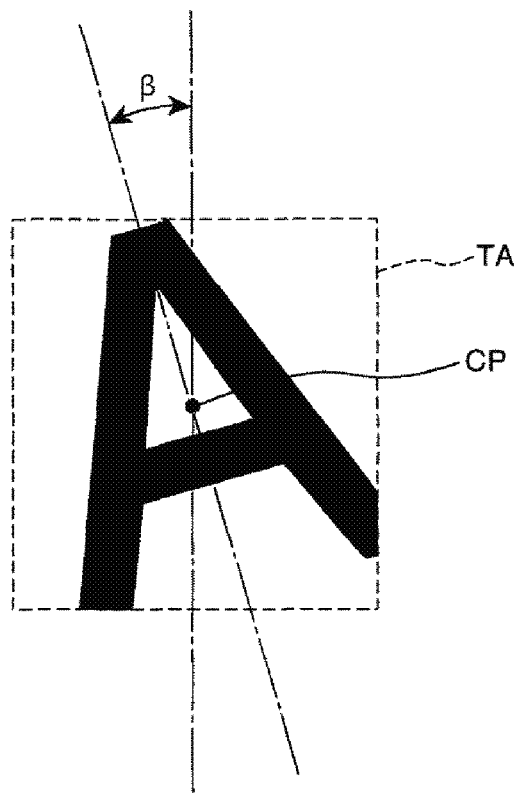
FIG. 14 is a diagram illustrating a state in which an attitude of the reference image illustrated in FIG. 13 is changed.

FIG. 13 is a diagram for explaining a reference image (template) in a search region in an encoder according to a fifth embodiment of the invention. FIG. 14 is a diagram illustrating a state in which an attitude of the reference image illustrated in FIG. 13 is changed.

Hereinafter, the fifth embodiment will be described focusing on a difference from the above-described embodiments, and a description of the same content will be omitted.

The present embodiment is the same as the first to fourth embodiments except that angle correction is performed on a reference image as appropriate in template matching.

As described above, since an image of the mark 21 in the effective visual field region RU is moved along the circular arcs C1 and C2, an attitude of the image is inclined toward the X axis or the Y axis depending on a position of the image. If an inclination of the image of the mark 21 increases with respect to the reference image TA, an error of template matching increases (for example, a correlation value is reduced even if positions match each other), and thus the determination accuracy of a rotation angle deteriorates. As a method of preventing deterioration in the determination accuracy of a rotation angle, as described above, there may be a method in which a correlation value is obtained for each pixel position of the reference image TA by deviating the reference image TA by one pixel in the search region RS as described above, then a correlation value is computed again while slightly changing, for example, an attitude (angle) of the reference image TA at some pixel positions where the correlation value is equal to or greater than a predetermined value, and a pixel position and an angle causing the correlation value to be the maximum are determined. However, in this method, a calculation amount rapidly increases.

Therefore, in the present embodiment, focusing on the fact that an inclination of an image of the mark 21 in the effective visual field region RU changes depending on the rotation angle θ, for example, an attitude of the reference image TA is changed (hereinafter, also referred to as "an inclination is corrected") on the basis of the rotation angle θ13 obtained in the same manner as in the second embodiment or the third embodiment. If the rotation angle θ13 is understood, an inclined angle β of the reference image TA to be corrected is uniquely defined, and thus only calculation of correcting an inclination of the reference image TA once is added. A calculation amount is slightly increased due to this added calculation, but the determination accuracy of the rotation angle θ can be increased.

Meanwhile, in the above-described embodiments, a description has been made of a case where the upper left pixel is set as a reference pixel of the reference image TA, but, in a case where an inclination of the reference image TA is corrected as in the present embodiment, as illustrated in FIG. 13, it is preferable that a pixel as close to the center CP of the reference image TA as possible is set as a reference pixel, and inclination correction is performed by rotating the reference image TA by the inclined angle β with the reference pixel as a reference (center). Consequently, it is possible to reduce a position difference of the reference image TA due to the inclination correction of the reference image TA. Correction of enlarging or reducing the reference image TA with the center CP as a reference may be performed.

In a case where inclination correction of the reference image TA is performed, preferably, pixels corresponding to a predetermined width are added to the outer periphery of the reference image TA such that a pixel range of the reference image TA is enlarged, then the pixel range is rotated by an angle (inclined angle β) corresponding to the inclination correction, and the pixel range after being rotated is trimmed to a size of the original pixel range of the reference image TA. Consequently, as illustrated in FIG. 14, it is possible to reduce the occurrence of pixel defects in the reference image TA after inclination correction. Even if pixel defects occur in the reference image TA, template matching is not impossible although the detection accuracy is reduced. Even if the reference image TA is not subjected to inclination correction, a calculation amount increases by subjecting the search region RS to inclination correction, but the determination accuracy can be increased in the same manner.

Such inclination correction of the reference image TA may be performed at each pixel position of the reference image TA, but, in a case where an inclination of the mark 21 is small, even if inclination correction of the reference image TA is not performed, there is little influence on the determination accuracy of the rotation angle θ. Therefore, for example, in a case where the rotation angle θ13 is predicted as described above, it is determined whether or not the predicted rotation angle θ13 is equal to or less than a predetermined angle, inclination correction of the reference image TA is performed in a case where the rotation angle θ13 is more than the predetermined angle, and, on the other hand, a calculation time is reduced by omitting inclination correction of the reference image TA in a case where the rotation angle θ13 is equal to or less than the predetermined angle.

As mentioned above, in the present embodiment, the determination portion 5 can change an attitude of the reference image TA in the captured image G on the basis of information regarding the rotation angle θ13 of the first arm 120 (rotation portion) with respect to the base 110 (base portion). Consequently, in a case where a change in an attitude of an image of the mark 21 in the search region RS is great, it is possible to increase the accuracy of template matching while reducing a calculation amount related to the template matching.

The determination portion 5 determines whether or not the rotation angle θ13 of the first arm 120 (rotation portion) with respect to the base 110 (base portion) is larger than a set angle, and changes an attitude of the reference image TA in the captured image G on the basis of a determination result. Consequently, it is possible to further reduce a calculation amount related to template matching while achieving high accuracy of the template matching.

Sixth Embodiment

Figure 15:
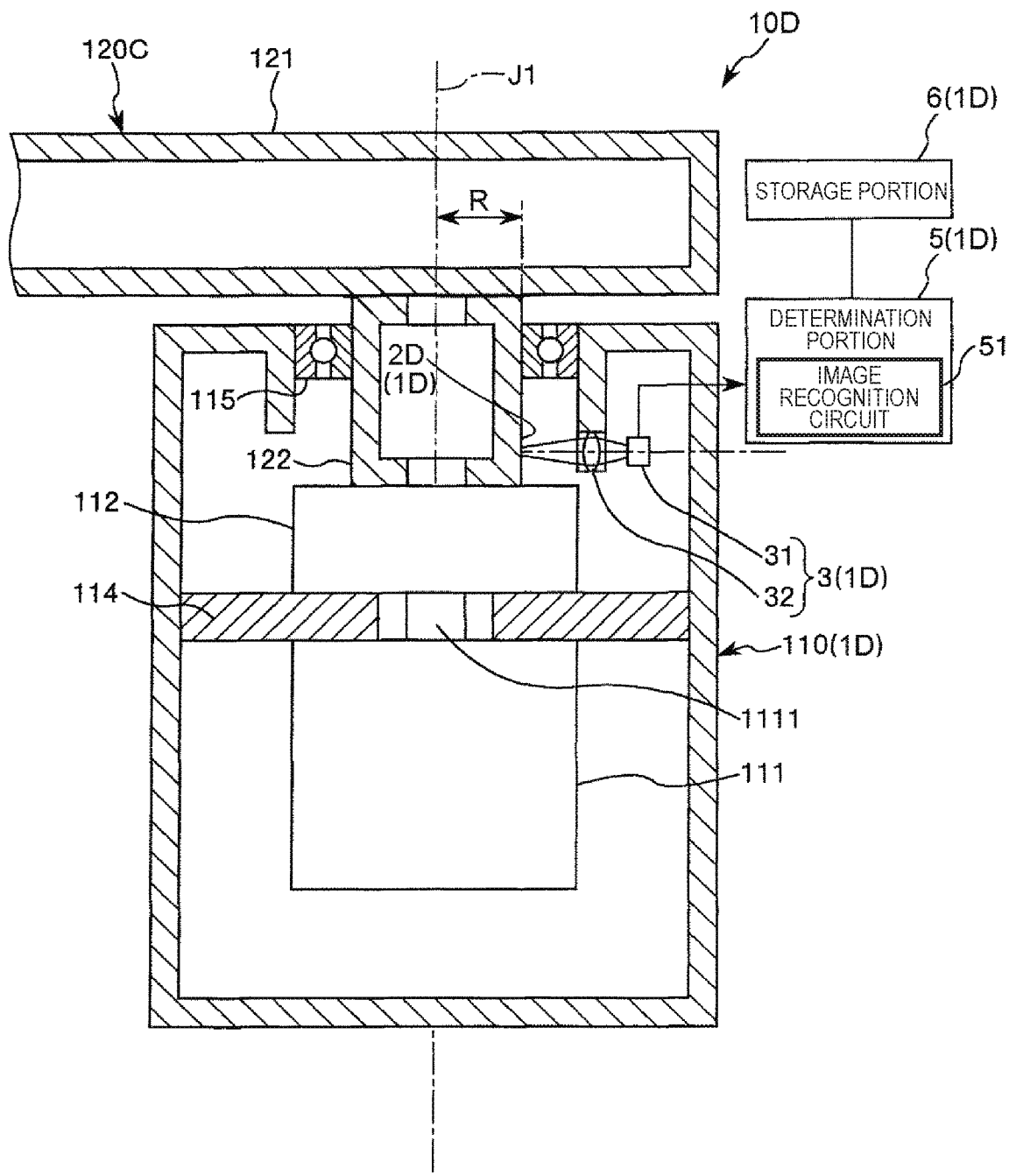
FIG. 15 is a sectional view for explaining an encoder according to a sixth embodiment of the invention.

FIG. 15 is a sectional view for explaining an encoder according to a sixth embodiment of the invention.

Hereinafter, the sixth embodiment will be described focusing on a difference from the above-described embodiments, and a description of the same content will be omitted.

The present embodiment is the same as the first embodiment except for an installation position of a mark of the encoder and a configuration related thereto.

A robot 10D illustrated in FIG. 15 includes an encoder 1D detecting a rotation state of the first arm 120 with respect to the base 110. The encoder 1D includes a mark portion 2D provided on a circumferential surface of the shaft portion 122 of the first arm 120, a mark detection portion 3 provided at the base 110 and detecting marks (not illustrated) of the mark portion 2D, a determination portions determining relative rotation states of the base 110 and the first arm 120 on the basis of a detection result in the mark detection portion 3, and a storage portion 6 which is electrically connected to the determination portion 5.

The mark portion 2D has a plurality of marks (not illustrated) disposed along a circumferential direction on an outer circumferential surface of the shaft portion 122. The plurality of marks may employ, for example, the same marks as the marks 21 of the first embodiment. In other words, a plurality of marks which can be identified, such as letters, numbers, and symbols, are disposed to be arranged in the circumferential direction on the circumferential surface (cylindrical surface) of the shaft portion 122. The marks of the mark portion 2D may be directly provided on the surface of the shaft portion 122, and may be provided on a cylindrical member attached to the shaft portion 122.

In the present embodiment, the imaging element 31 and the lens 32 of the mark detection portion 3 are disposed to detect the marks of the mark portion 2D. In other words, a direction in which the marks of the mark portion 2D and the mark detection portion 3 are arranged is a direction (in the present embodiment, a direction perpendicular to) intersecting the first axis J1. Consequently, the marks of the mark portion 2D and the mark detection portion 3 can be made close to the first axis J1. As a result, it is possible to achieve miniaturization of the base 110 or the lightweight base 110.

In the encoder 1D, an imaging region of the imaging element 31 is set on the outer circumferential surface of the shaft portion 122. Template matching is performed in the same manner as in the first embodiment. In this case, the marks of the mark portion 2D are provided on the outer circumferential surface of the shaft portion 122, and are thus moved linearly in the imaging region at a constant attitude due to rotation of the shaft portion 122. Thus, since a reference image is moved in only one direction without changing a direction of the reference image (template) according to an attitude of the mark in the imaging region when template matching is performed, there is an advantage in that a calculation amount related to the template matching can be reduced.

However, since the outer circumferential surface of the shaft portion 122 is curved, in a case where the lens 32 is an enlargement optical system or a reduction optical system, a size of the mark of the mark portion 2D in the imaging region of the imaging element 31 changes depending on a position thereof in the imaging region due to a change in a distance to the lens. Therefore, the reference image is preferably enlarged or reduced when template matching is performed from the viewpoint of increasing the accuracy thereof. Even if such enlargement or reduction of a reference image is not performed, highly accurate template matching can be performed by setting a search region in a small range in which a size of the mark of the mark portion 2D can be regarded not to be changed, or by designing the lens 32 such that a size of the mark of the mark portion 2D in the search region of the imaging element 31 is not changed.

According to the seventh embodiment described above, it is also possible to increase the detection accuracy while achieving low cost.

Printer

Figure 16:
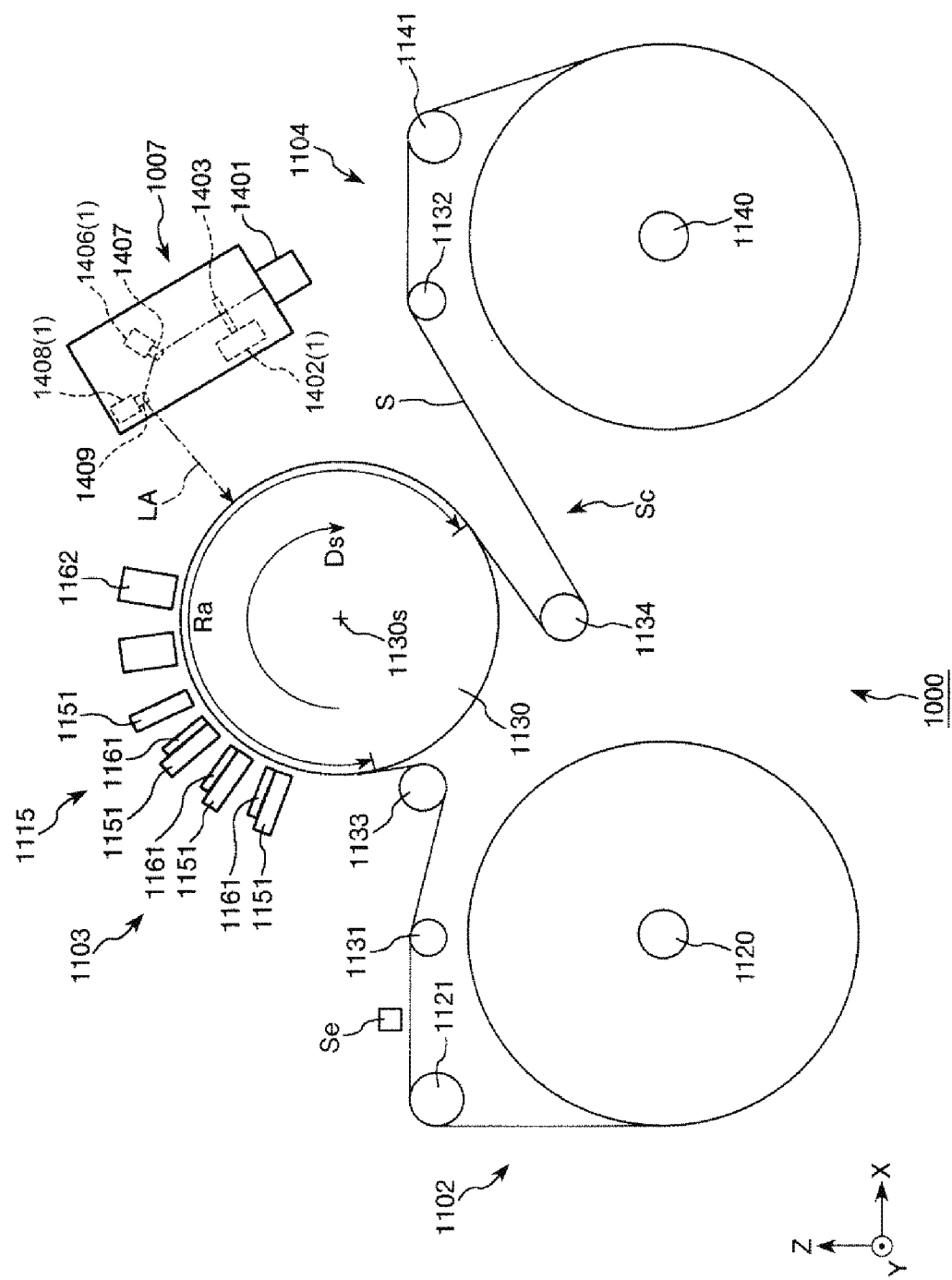
FIG. 16 is a diagram illustrating a schematic configuration of a printer of an embodiment of the invention.

FIG. 16 is a diagram illustrating a schematic configuration of a printer of an embodiment of the invention.

A printer 1000 illustrated in FIG. 16 is a label printing device including a drum-shaped platen. In the printer 1000, a single sheet S (web) such as a paper type or a film type as a recording medium of which both ends are wound on a delivery shaft 1120 and a winding shaft 1140 in a roll form is hung between the delivery shaft 1120 and the winding shaft 1140, and the sheet S is transported from the delivery shaft 1120 to the winding shaft 1140 along a transport path Sc hung in the above-described way. The printer 1000 is configured to record (form) an image on the sheet S by discharging a functional liquid onto the sheet S transported along the transport path Sc.

The printer 1000 is configured to include a delivery portion 1102 which delivers the sheet S from the delivery shaft 1120, a process portion 1103 which records an image on the sheet S delivered from the delivery portion 1102, a laser scanner device 1007 which cuts out the sheet S on which the image is recorded in the process portion 1103, and a winding portion 1104 which winds the sheet S on the winding shaft 1140.

The delivery portion 1102 includes the delivery shaft 1120 winding an end of the sheet S thereon, and a driven roller 1121 winding the sheet S extracted from the delivery shaft 1120 thereon.

In the process portion 1103, the sheet S delivered from the delivery portion 1102 is supported by a platen drum 1130 as a support portion, and a recording head 1151 or the like disposed in a head unit 1115 which is disposed along an outer circumferential surface of the platen drum 1130 performs an appropriate process so as to record an image on the sheet S.

The platen drum 1130 is a circular drum which is rotatably supported by a support mechanism (not illustrated) centering on a drum shaft 1130*s*, and winds the sheet S transported from the delivery portion 1102 to the winding portion 1104 on a rear surface (a surface on an opposite side to a recording surface) side thereon. The platen drum 1130 is driven to rotate in a transport direction Ds of the sheet S as a result of receiving friction force with the sheet S, and supports the sheet S from the rear surface side in a range Ra in the circumferential direction thereof. Here, the process portion 1103 is provided with driven rollers 1133 and 1134 turning the sheet S on both sides of the winding portion to the platen drum 1130. Driven rollers 1121 and 1131 and a sensor Se are provided between the delivery shaft 1120 and the driven roller 1133, and driven rollers 1132 and 1141 are provided between the winding shaft 1140 and the driven roller 1134.

The process portion 1103 includes a head unit 1115, and the head unit 1115 is provided with four recording heads 1151 corresponding to yellow, cyan, magenta, and black. Each of the recording heads 1151 faces a front surface of the sheet S wound on the platen drum 1130 with a slight clearance (platen gap), and discharges a functional liquid of a corresponding color from nozzles in an ink jet method. The respective recording heads 1151 discharge functional liquids onto the sheet S transported in the transport direction Ds, and thus a color image is formed on the front surface of the sheet S.

Here, as the functional liquids, ultraviolet (UV) ink (photocurable ink) which is cured when being irradiated with ultraviolet rays (light) is used. Thus, the head unit 1115 of the process portion 1103 is provided with first UV light sources 1161 (light irradiation portions) among the plurality of recording heads 1151 in order to temporarily cure the UV ink and to fix the UV ink to the sheet S. A second UV light source 1162 as a curing portion is provided on a downstream side of the transport direction Ds with respect to the plurality of recording heads 1151 (head unit 1115).

The laser scanner device 1007 is provided to partially cut out the sheet S on which an image is recorded, or to divide the sheet S. Laser light which is caused to oscillate by a laser oscillator 1401 of the laser scanner device 1007 is applied to the sheet S which is a processed object via a first lens 1403 and a first mirror 1407 or a second mirror 1409 of which positions or rotation positions (angles) are controlled by drive devices 1402, 1406 and 1408 including the encoder 1. As mentioned above, an irradiation position of laser light LA applied to the sheet S is controlled by the respective drive devices 1402, 1406 and 1408, and thus the laser light LA can be applied to a desired position on the sheet S. In the sheet S, a portion thereof irradiated with the laser light LA is melted, and thus the sheet S is partially cut out or divided.

The printer 1000 described above includes the encoder 1. The encoder 1 can increase the detection accuracy while achieving low cost as described above. Thus, it is possible to perform highly accurate operation control of the printer 1000 by using a detection result in the encoder 1. It is also possible to achieve low cost of the printer 1000.

As mentioned above, the encoder, the robot, and the printer according to the preferred embodiments of the invention have been described, but the invention is not limited thereto, and a configuration of each portion may be replaced with any configuration having the same function. Any other constituent element may be added thereto. The configurations of the above-described two or more embodiments may be combined with each other.

In the embodiments, a description has been made of an exemplary configuration in which the base of the robot is a "first member" or a "base portion", and the first arm is a "second member" or a "rotation portion", but this is only an example, and one of any two members which are relatively rotated may be a "first member" or a "base portion", and the other member is a "second member" or a "rotation portion". A location where the encoder is provided is not limited to a joint between the base and the first arm, and may be a joint between any two arms which are relatively rotated. A location where the encoder is provided is not limited to a joint of the robot.

In the above-described embodiments, the number of arms of the robot is one, but the number of arms of the robot is not limited thereto, and may be, for example, two or more. In other words, the robot according to the embodiments of the invention may be, for example, a robot with two arms or a robot with a plurality of arms.

In the above-described embodiments, the number of arms of the robot is two, but the number of arms of the robot is not limited thereto, and may be, for example, one, or three or more.

In the above-described embodiments, a location where the robot according to the embodiments of the invention is provided is not limited to a floor surface, and may be, for example, a ceiling surface or a sidewall surface. The robot according to the embodiments of the invention is not limited to being provided to be fixed to a structure such as a building, and may be, for example, a leg type walking (traveling) robot having legs.

In the above-described embodiments, as an example of a robot according to the embodiments of the invention, the horizontal articulated robot has been described, but a robot according to the embodiments of the invention may be robots of other types such as a vertical articulated robot as long as two members which are relatively rotated are provided therein.

The encoder according to the embodiments of the invention is not limited to the above-described printer, and may be used for various printers such as an industrial printer and a consumer printer with a rotation portion. In a case where the encoder according to the embodiments of the invention is used for a printer, a location where the encoder is provided is not limited to the above-described locations, and may be used for a paper feeding mechanism, and a movement mechanism of a carriage mounted with an ink head of an ink jet printer, for example.

The entire disclosure of Japanese Patent Application No. 2017-009720, filed Jan. 23, 2017 is expressly incorporated by reference herein.

What is claimed is:
1. An encoder comprising:
a base;
a rotation member that is rotationally connected to the base, the rotation member being rotatable about a rotation axis, the rotation member having a surface facing the base;
a plurality of marks disposed on the surface of the rotation member around the rotation axis;
an image sensor that is disposed in the base, the image sensor being configured to capture a first image of the marks;
a memory configured to store a plurality of reference images and corresponding coordinates of the reference images, the reference images corresponding to the marks, respectively; and
a determiner configured to:
compare each pixel of the captured first image with each pixel of the reference images by shifting pixels of the captured first image so as to generate correlation values;
select a corresponding reference image among the reference images that has a maximum number of the correlation values;
determine a number of pixels shifted from a first pixel of the captured image to a corresponding first pixel of the selected corresponding reference image; and
determine a relative rotation angle between the base and the rotation member based on the number of shifted pixels by using the coordinates of the selected corresponding reference image.

2. The encoder according to claim 1,
wherein the captured first image includes an entirety of adjacent two marks of the plurality of marks located in a circumferential direction around the rotation axis.

3. The encoder according to claim 1,
wherein the determiner is configured to set a search region in the captured first image, and
the determiner is configured to compare each pixel of the search region in the captured first image with each pixel of the reference images by shifting pixels of the search region in the captured first image so as to generate the correlation values.

4. The encoder according to claim 3,
wherein the determiner is configured to change at least one of a first position and a first length of the search region in a first direction in the captured first image of based on angular velocity about the rotation axis.

5. The encoder according to claim 4,
wherein the image sensor is configured to repeatedly capture the first image,
the determiner is configured to repeatedly perform the comparison of the pixels with respect to a plurality of the captured first images, the selection of the corresponding reference image, the determination of the number of pixels, and the determination of the relative rotation angle, and
the determiner is configured to calculate the angular velocity based on the determined past two or more relative rotation angles.

6. The encoder according to claim 4,
wherein the determiner is configured to change at least one of a second position and a second length of the search region in a second direction perpendicular to the first direction in the captured first image based on the first position of the search region in the first direction in the captured first image.

7. The encoder according to claim 3,
wherein the determiner is configured to change at least one of a first position and a first length of the search region in a first direction in the captured first image based on angular acceleration about the rotation axis.

8. The encoder according to claim 7,
wherein the image sensor is configured to repeatedly capture the first image,
the determiner is configured to repeatedly perform the comparison of the pixels with respect to a plurality of the captured first images, the selection of the corresponding reference image, the determination of the number of pixels, and the determination of the relative rotation angle, and
the determiner is configured to calculate the angular acceleration based on the determined past three or more relative rotation angles.

9. The encoder according to claim 1,
wherein the determiner is configured to change an attitude of the mark in the captured first image based on information regarding a rotation angle of the mark in the captured first image with respect to the base.

10. The encoder according to claim 9,
wherein the determiner is configured to determine whether the rotation angle of the mark in the captured first image with respect to the base is larger than a set angle, and
when the determiner determines that the rotation angle is larger than the set angle, the determiner is configured to change the attitude of the mark in the captured first image.

11. A robot comprising:
a base;
a first arm rotatably connected to the base, the first arm being rotatable about a rotation axis of a shaft, the first arm having a surface facing the base;
a plurality of marks disposed on the surface of the first arm around the rotation axis;
a second arm rotatably connected to the first arm;
an image sensor that is disposed in the base, the image sensor being configured to capture a first image of the marks;
a memory configured to store a plurality of reference images and corresponding coordinates of the reference images, the reference images corresponding to the marks, respectively; and
a determiner configured to:
compare each pixel of the captured first image with each pixel of the reference images by shifting pixels of the captured first image so as to generate correlation values;
select a corresponding reference image among the reference images that has a maximum number of the correlation values;
determine a number of pixels shifted from a first pixel of the captured image to a corresponding first pixel of the selected corresponding reference image; and
determine a relative rotation angle between the base and the first arm based on the number of shifted pixels by using the coordinates of the selected corresponding reference image.

12. A printer comprising:
a platen drum on which a recording medium is placed;
a recording head through which a recoding fluid is ejected on the recording medium; and
a light scanner having a light source and an encoder, the light source emitting a light toward the recording medium, the encoder controlling a light emitting direction of the light emitted from the light source, the encoder being configured with:
a base;
a rotation member that is rotatably connected to the base, the rotation member being rotatable about a rotation axis, the rotation member having a surface facing the base;
a plurality of marks disposed on the surface of the rotation member around the rotation axis;
an image sensor that is disposed in the base, the image sensor being configured to capture a first image of the marks;
a memory configured to store a plurality of reference images and corresponding coordinates of the reference images, the reference images corresponding to the marks, respectively; and
a determiner configured to:
compare each pixel of the captured first image with each pixel of the reference images by shifting pixels of the captured first image so as to generate correlation values;
select a corresponding reference image among the reference images that has a maximum number of the correlation values;
determine a number of pixels shifted from a first pixel of the captured image to a corresponding first pixel of the selected corresponding reference image; and
determine a relative rotation angle between the base and the rotation member based on the number of shifted pixels by using the coordinates of the selected corresponding reference image.

* * * * *